May 31, 1960   J. N. HIX ET AL   2,938,846
FUEL ELEMENT FABRICATION METHOD
Original Filed Aug. 7, 1956

INVENTORS.
George E. Cooley
BY   John E. Cunningham
Joseph N. Hix

ATTORNEY 2,938,846
Patented May 31, 1960

2,938,846
FUEL ELEMENT FABRICATION METHOD

Joseph N. Hix, Kingston, John E. Cunningham, Oak Ridge, and George E. Cooley, McMinnville, Tenn., assignors to the United States of America as represented by the United States Atomic Energy Commission Continuation of application Ser. No. 602,683, Aug. 7, 1956. This application Aug. 28, 1959, Ser. No. 836,838

2 Claims. (Cl. 204—154.2)

This invention relates to an improved method of assembling and fabricating a multiplate neutronic reactor fuel element of the general type disclosed in The Reactor Handbook, vol 2, pp. 243 and 244, and this application is a continuation of our prior application S.N. 602,683, filed August 7, 1956, now abandoned.

As there disclosed, such a fuel element comprises a plurality of spaced parallel fuel plates of a bowed configuration supported by and between a pair of transverse aluminum side plates. The fuel plates each comprise an inner layer of uranium-aluminum alloy which is surrounded on all sides by a protective outer layer of aluminum. The fuel plates fit into accommodating parallel grooves cut in the inner opposing faces of the side plates. Such fuel elements have come to assume an important place in the neutronic reactor art, and are presently employed in many operating reactors, including the materials testing reactor described in report T.I.D.–7001, Materials Testing Reactor Handbook, edited by J. H. Buck and C. F. Leyse.

The prior art method of assembling and fabricating these fuel elements involved a conventional brazing technique wherein individual strips of brazing alloy were laid on opposite sides of each fuel plate adjacent the associated grooves of the supporting side plates preparatory to the brazing heat treatment, the entire assembly being temporarily supported at this time in a jig, and the individual fuel plates being supported by the grooves in the side plates. The grooves had to be sufficiently deep to provide temporary support for the fuel plates during the initial assembly, taking into account the slight unavoidable variations in width of the individual fuel elements. At the same time, the thickness of the side plate beyond the groove had to be sufficient to provide structural rigidity and strength to the finished fuel element. Thus, the required total thickness of the side plate was determined, in part, by the depth of the groove necessary to provide temporary support for the fuel elements during initial assembly.

In accordance with the principles of the present invention, the brazing alloy is preplaced on one surface of the aluminum side plates in the form of a cladding or layer of uniform thickness. The grooves are then cut in the side plates through the alloy layer and into the base aluminum. Since a portion of the necessary groove depth is thus supplied by the brazing alloy, the brazing alloy, itself, assists in the temporary support of the fuel plates during the preliminary assembly. This permits utilizing thinner aluminum side plates, which is, of course, highly desirable in reactors of the materials testing reactor type, since a lower aluminum-to-water ratio for the reactor is thereby obtained. Also, since the depth of the groove in the aluminum base portion of the side plate is smaller (approximately one-half of the groove depth previously required), the brazing flux is more efficiently flushed out by the brazing alloy during the subsequent brazing heat treatment. Since the brazing flux necessarily contains elements having a high neutron absorption cross-section, such as lithium, this more efficient flushing out of the brazing flux is of special advantage. The smaller depth of groove in the aluminum base portion of the side plate also results in a lesser amount of the brazing alloy, itself, being required to fill the groove and being incorporated in the finished fuel element. This is of considerable advantage since the brazing alloy contains considerable silicon which interferes with the chemical processing of the fuel element which is ultimately necessary to recover unused fuel. In addition to the above advantages, preplacing of the brazing alloy is much more convenient and efficient than the time consuming process of manually placing individual strips of brazing alloy at their proper positions, and it is much more adapted to a controlled high quality production type operation producing uniform fuel elements containing minimum contaminants and extraneous material.

An object of the invention, therefore, is to provide an improved method of fabricating multiplate fuel elements of the materials testing reactor type which permits the use of thinner aluminum side plates.

Another object of the invention is to provide an improved method of fabricating multiplate fuel elements of the materials testing reactor type which permits the use of shallower grooves in the aluminum side plates.

Another object of the invention is to provide an improved method of fabricating multiplate fuel elements of the materials testing reactor type which results in the final product containing less brazing flux constituents and less brazing alloy.

Still another object of the invention is to provide an improved method of fabricating multiplate fuel elements of the materials testing reactor type which is more efficient and more adapted to a production type operation providing a uniform quality controlled finished product.

These and other advantages will become more apparent from the following description, when taken in connection with the accompanying drawing, wherein.

Figure 3:
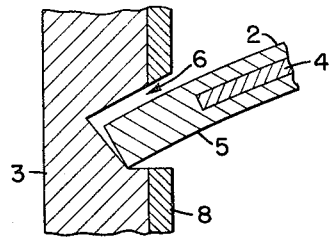
Figure 3 is a fragmentary cross-sectional view showing the spatial relationship between a fuel plate and associated side plate groove during a subsequent stage in the fabrication process.
Figure 4:
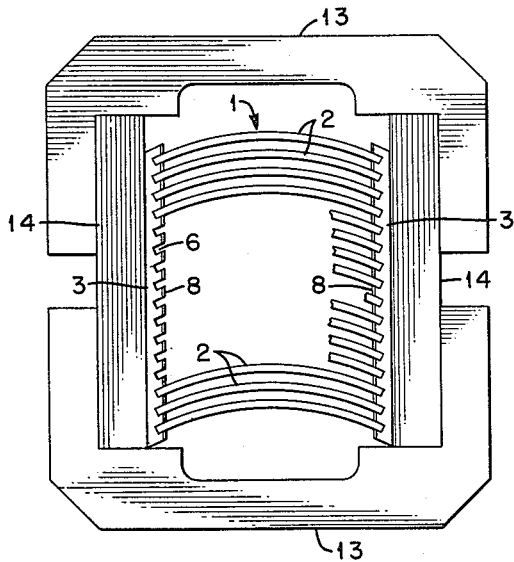
Figure 4 is an end view of a fuel element positioned in a refractory brazing jig.
Figure 5:
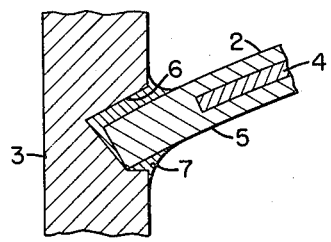
Figure 5 is a fragmentary cross-sectional view showing the spatial relationship between a fuel plate and associated side plate groove after brazing.

Referring now to the drawings, reference numeral 1 designates the fuel element generally, reference numeral 2 designates the plurality of fuel plates, and reference numeral 3 designates the supporting side plates. As shown in Figs. 3–5, each fuel plate 2 consists of an inner fissionable material containing layer 4, for example, a 10–20% enriched uranium—80–90% aluminum alloy, surrounded on all sides by a protective outer cladding 5 of aluminum. The fabrication of the fuel plates 2, themselves, forms no part of the present invention, and may be accomplished by methods described in "MTR-Type Fuel Elements," J. E. Cunningham and E. J. Boyle, a paper released in connection with the August 1955 Geneva Conference and designated as A/Conf./.8/P/953.

The side plates 3 of the final product are formed solely of aluminum, as shown in Figure 5, this Figure 5 also showing the spatial relationship, in the final product, between the fuel plate 2, the associated groove 6 in the side plate, and the brazing alloy 7.

Figure 2:
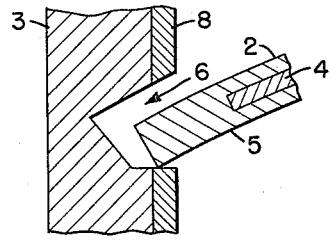
Figure 2 is a fragmentary cross-sectional view showing the spatial relationship between a fuel plate and associated side plate groove during initial assembly.

In accordance with the principles of the present invention, the brazing alloy, which, for example, may constitute a 12% Si–88% Al alloy, is preplaced upon one surface of the side plate 3 in the form of a cladding 8 of uniform thickness, as most clearly shown in Figures 2 and 3. Braze-clad aluminum sheet material may be fabricated by rolling together a base sheet of aluminum and a sheet of the braze alloy at 525–550° C. The braze-clad side plates 3, 8 may then be cut to size from this sheet material. Typically, the thickness of this composite side plate, with cladding, is about 125 mils, and the thickness of the brazing alloy cladding, itself, is about 19 mils.

After the braze-clad side plates 3, 8 is properly dimensioned, the parallel grooves 6 are cut by gang milling, the grooves extending entirely through the brazing alloy cladding 8 and part way into the aluminum side plate 3 proper, as shown in Figures 2 and 3. The braze-clad side plates 3, 8 are then coated with a slurry of a commercial brazing flux and alcohol. The brazing flux disclosed in U.S. Patent No. 2,481,053, "Welding or Brazing Flux Composition," Rene Wassermann, September 6, 1949, may, for example, be used, this flux comprising a eutectic mixture of chlorides and/or fluorides of sodium, lithium, potassium, and cadmium.

Figure 1:
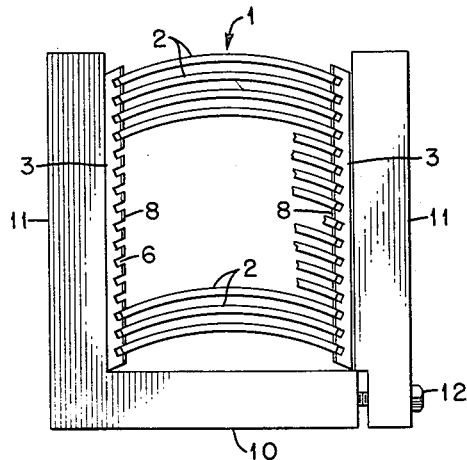
Figure 1 is an end view of a fuel element positioned in a drying jig during initial assembly.

The fuel element 1 is then initially assembled in the metal drying jig 10 (see Figure 1), the distance between the upstanding sides 11 of which is adjustable by means of bolts 12. The drying jig 10 is first opened up slightly, as illustrated in Figure 1, and the two braze-clad side plates 3, 8 are placed against the sides 11 of the jig. In the open position of the jig 10, the fuel plates 2 can be inserted endwise into the appropriate grooves and slid into place. At this time, the fuel plates 2 are supported solely by the grooves 6 in the braze-clad side plates 3, 8, and at least one side of at least some of the plates receives its sole support from the brazing alloy cladding 8. Figure 2 illustrates how one typical fuel plate 2 may be spatially related to an associated groove 6 at this stage in the fabrication process, the illustrated fuel element being supported at one edge solely by the brazing alloy cladding 8.

After all fuel plates 2 have been inserted and properly aligned, the drying jig 10 is tightened. The fuel element illustrated in Figure 2 is thereby caused to assume that spatial relationship to the groove which is shown in Figure 3.

The drying jig 10 with its assembled fuel element 1 is then subjected to a three to four hour heat treatment as about 150° C. After this heat treatment, the fuel element 1, due to the tackiness of the brazing flux, has sufficient strength to support itself and to be manually handled without falling apart.

The fuel element is then manually transferred to the self-aligning brazing jig, as shown in Figure 4. The brazing jig consists simply of a pair of upper and lower generally U-shaped members 13 and a pair of cooperating side panels 14, all these pieces being separable. The brazing jig forms an elongated rectangular enclosure of a size just sufficient to accommodate the fuel element 1. The brazing jig is formed of a suitable refractory material.

The brazing jig and its included fuel element is then preheated for about an hour at 500° C., and then subjected to a brazing heat treatment at about 610° C. for twenty-five minutes in a forced-circulation furnace. During the brazing process, the brazing alloy forming the cladding 8 becomes molten and flows down to the next lower fuel plate 2 and into and around the associated groove 6, capillary action causing it to fill the groove completely. After cooling to room temperature, the fuel element 1 is then washed to remove the water soluble brazing flux, cleaned in an acid bath, rinsed in hot water, and dried. Figure 5 illustrates the spatial relationship of the fuel plate 2 and groove 6 in the finished fuel element, the brazing alloy 7 completely filling the groove 6 and extending outwardly a little along the surface of the fuel plate.

Since many changes could be made in the above fabrication method and many apparently widely different embodiments of this invention could be made without departing from the principles thereof, it is intended that all matter contained in the above description, or shown in the accompanying drawing, shall be interpreted as illustrative and not in a limiting sense.

What we claim is:

1. In a method of fabricating a reactor fuel element of the type which comprises a plurality of spaced parallel aluminum clad fissionable material containing fuel elemnts supported by, and between, a pair of parallel aluminum side plates, the steps of hot rolling on one side of a sheet of aluminum a sheet of brazing alloy having a melting point lower than that of the sheet of aluminum, forming the side plates from the resulting braze-clad aluminum sheet, cutting a plurality of grooves in the alloy side of the side plates through the alloy and extending into the aluminum base plate, positioning the two side plates within a drying jig vertically on edge a fixed distance apart with their grooved surfaces facing one another and the grooves running horizontally, assembling the fuel element by sliding the fuel plates endwise into the associated grooves, the distance between said side plates during the assembly step being such that at least some of the fuel plates are supported on at least one side solely by the brazing alloy, moving said side plates toward one another such that all of the fuel plates are supported solely by the base aluminum of the side plates, subjecting the assembly to a drying treatment to remove liquids, then removing the assembly from the drying jig and inserting it in a brazing jig, and subsequently subjecting the assembled fuel element to a brazing heat treatment to raise the temperature of the brazing alloy to the point where it forms a bond between the fuel plates and the side plates in and around the grooves.

2. In a method of fabricating a reactor fuel element of the type which comprises a plurality of spaced parallel aluminum clad fissionable material containing fuel elements supported by, and between, a pair of parallel aluminum side plates, the steps of hot rolling a sheet of an 88% aluminum–12% silicon brazing alloy on one side of a sheet of aluminum, forming the side plates from the resulting braze-clad aluminum sheet, cutting a plurality of grooves in the alloy side of the side plates through the alloy and extending into the aluminum base plate, positioning the side plates in a drying jig, then positioning the fuel plates between the pair of sides plates with opposing edges of the fuel plates engaging opposing grooves of the side plates, subjecting the assembly to a drying treatment in the 150° C. range, then inserting the assembly in a ceramic brazing jig, then preheating the assembly at a temperature within the 500° C. region, and subjecting the fuel element to a brazing heat treatment to raise the temperature to the point where a bond is formed between the fuel plates and side plates.

References Cited in the file of this patent
International Conf. on Peaceful Uses of Atomic Energy, vol. 9, August 1955, pages 203–207.